(12) United States Patent
Kona et al.

(10) Patent No.: US 11,722,457 B2
(45) Date of Patent: Aug. 8, 2023

(54) SECURE MULTI-TENANT CLOUD SUBSCRIPTION SHARING

(71) Applicant: MICROSOFT TECHNOLOGY LICENSING, LLC, Redmond, WA (US)

(72) Inventors: Kalyan Kumar Kona, Redmond, WA (US); Qiwen Zheng, Sammamish, WA (US); Darius Snapkauskas, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/332,710

(22) Filed: May 27, 2021

(65) Prior Publication Data
US 2022/0385629 A1    Dec. 1, 2022

(51) Int. Cl.
*G06F 15/16* (2006.01)
*H04L 9/40* (2022.01)
(Continued)

(52) U.S. Cl.
CPC ........ *H04L 63/0209* (2013.01); *H04L 47/827* (2013.01); *H04L 67/10* (2013.01); *H04L 67/52* (2022.05)

(58) Field of Classification Search
CPC ... H04L 63/0209; H04L 67/52; H04L 47/827; H04L 67/10
See application file for complete search history.

(56) References Cited

U.S. PATENT DOCUMENTS

| 10,521,746 B2 | 12/2019 | Seetharam et al. |
| 10,560,458 B2 | 2/2020 | Drabant |

(Continued)

FOREIGN PATENT DOCUMENTS

| EP | 2893685 A1 | 7/2015 |
| WO | 2016018438 A1 | 2/2016 |

OTHER PUBLICATIONS

Simão, Jorge, "Cloud Manager: A New Multicloud PaaS Platform Built on Kubernetes", Retrieved from: https://thenewstack.io/cloud-manager-a-new-multicloud-paas-platform-built-on-kubernetes/, Jan. 7, 2021, 20 Pages.

(Continued)

*Primary Examiner* — Normin Abedin
(74) *Attorney, Agent, or Firm* — Newport IP, LLC; Jacob P. Rohwer

(57) ABSTRACT

The disclosed techniques improve the efficiency and functionality of cloud services by providing a system for sharing individual subscriptions among multiple tenants. A cloud service provider utilizes a location-based manager to retrieve a pool of subscriptions from a cloud platform. Individual subscriptions within the pool can define a set of cloud resources for a resource unit such as a server farm. The location-based manager can assign one or multiple subscriptions for a resource unit to share amongst multiple tenants. In this way, security boundaries between individual tenants can be maintained while also dramatically reducing the number of subscriptions a cloud service provider must manage. In addition, by assigning subscriptions at the granularity of resource units rather than tenants, the location-based manager can enhance the security of the cloud platform by creating a logical zone about individual resource units to serve as an additional security boundary.

20 Claims, 7 Drawing Sheets

(51) Int. Cl.
*H04L 67/52* (2022.01)
*H04L 47/70* (2022.01)
*H04L 67/10* (2022.01)

(56) References Cited

U.S. PATENT DOCUMENTS

| | | |
|---|---|---|
| 10,778,597 B1 | 9/2020 | Tan et al. |
| 2012/0191754 A1 | 7/2012 | Cecilia et al. |
| 2013/0219067 A1* | 8/2013 | Boss ............... H04W 4/029 |
| | | 709/226 |
| 2014/0330869 A1* | 11/2014 | Factor ............. G06F 21/6281 |
| | | 707/783 |
| 2015/0363724 A1 | 12/2015 | Chatterjee et al. |
| 2019/0098037 A1* | 3/2019 | Shenoy, Jr. ......... H04L 63/1441 |
| 2019/0370833 A1 | 12/2019 | Gold et al. |
| 2022/0103598 A1* | 3/2022 | Vaidya ............. G06F 9/45558 |

OTHER PUBLICATIONS

"International Search Report and Written Opinion Issued in PCT Application No. PCT/US22/027185", dated Aug. 18, 2022, 9 Pages.

* cited by examiner

SECURE MULTI-TENANT CLOUD SUBSCRIPTION SHARING

BACKGROUND

As cloud computing rapidly gains popularity, more and more data and/or services are stored and/or provided online via network connections. Providing an optimal and reliable user experience is an important aspect for cloud service providers that offer network services. In many scenarios, a cloud service provider may provide a service to thousands or millions of users (e.g., customers, clients, etc.) geographically dispersed around a country, or even the world. In order to provide this service, a cloud service provider often utilizes different resources, such as server farms, hosted in various datacenters. Access to these resources is typically provided by a cloud platform which operates the datacenters. In addition, the service can be constructed of various software components (which may also be referred to as features or functions).

To leverage the numerous advantages of cloud computing, many cloud service providers purchase access to cloud resources provided by a cloud platform to enable, enhance, or otherwise operate their business. In turn, cloud service providers can configure various cloud resources allocated by the cloud platform with specific features and/or functions to offer products and/or services to their respective customers or users (often referred to collectively as tenants). As discussed, a cloud platform can serve many cloud service providers in various geographic locations. In addition, those cloud service providers can themselves have many tenants or customers. Thus, the number of end-users utilizing resources of a particular cloud platform can rapidly balloon into the millions as more service providers take to cloud computing. At such scale, security of individual tenants' computing resources and data is of utmost concern to cloud platforms and cloud service providers alike. To maintain security, individual tenants are typically assigned their own subscriptions to allocate cloud resources, thereby restricting unauthorized access to their data.

Unfortunately, as mentioned above, typical solutions for maintaining security boundaries between tenants requires that every individual tenant be assigned a subscription. Naturally, as the number of tenants grows into the millions, managing the multitude of subscriptions becomes cumbersome and impractical for individual cloud service providers. Furthermore, the computing and storage overhead created by assigning and managing millions of subscriptions places further burden on the overall cloud platform. For example, a small service provider may feasibly manage individual subscriptions for a few hundred tenants. However, as the service provider's tenancy grows into the thousands or even millions, the service provider must dedicate more and more resources and engineering effort to manage the tenancy's subscriptions.

Managing subscriptions in this way often unduly hampers the operations of service providers and can lead to compromised tenant security and ultimately a degraded experience for individual tenants. For instance, if a service provider is unable to keep up with subscription management for a large number of tenants, breaches in security at the individual tenant level can subsequently go undetected. Such security breaches can lead to widespread security compromise and severe disruptions to service as the service provider must take portions of the service offline to address the security issue. In addition, the service provider must commit significantly more resources and engineering effort to address these issues than if a more streamlined way of managing subscriptions had been in place allowing the service provider to detect the security breach earlier.

It is with respect to these and other consideration that the disclosure made herein is presented.

SUMMARY

The disclosed techniques improve the efficiency and functionality of cloud services by providing a system for sharing individual subscriptions among multiple tenants. Generally described, a cloud service provider utilizes a location-based manager to retrieve a pool of subscriptions from a cloud platform to allocate cloud resources to various tenants at a resource unit (e.g., a server farm). Individual subscriptions within the pool can define a set of cloud resources of the server farm (e.g., compute, storage, etc.) and a time period during which a tenant associated with the subscription may utilize the set of cloud resources.

In various examples, the location-based manager can assign one or multiple subscriptions for a resource unit to share amongst multiple tenants. Stated another way, while each tenant can be allocated their own subset of the set of cloud resources defined by the subscription, every tenant is nonetheless associated with the same subscription to the cloud resources provided by the cloud platform. In this way, security boundaries between individual tenants can be maintained while also dramatically reducing the number of subscriptions a cloud service provider must manage. In addition, by assigning subscriptions at the granularity of resource units rather than tenants, the location-based manager can enhance the security of the cloud platform by creating a logical zone about individual resource units to serve as an additional security boundary. In the event that security boundaries between individual tenants fail to contain a security breach, the additional security boundary provided by the multi-tenant shared subscription can contain security issues thereby protecting other resource units from similar exploits.

As will be further discussed below, the location-based manager can be assigned a geographic region (e.g., a state, a country, a continent, etc.) that contains multiple geographic areas. Each geographic area can in turn contain multiple resource units, e.g., server farms, each providing cloud resource access to a set of tenants. In such situations, the location-based manager can be configured to manage subscriptions for many resource units located within the assigned geographic region. Furthermore, a cloud service provider can deploy multiple location-based managers to efficiently serve tenants across many geographic regions. This is possible due to the drastic reduction in the number of subscriptions required to serve every tenant within a geographic region.

In contrast to existing solutions, assigning subscriptions at the resource unit level dramatically streamlines the process of subscription management for a cloud service provider by reducing the number of subscriptions needed to serve a given number of tenants. As discussed above, existing solutions require that ever tenant be assigned a unique subscription for access to the cloud platform's resources. Thus, as a cloud service provider's tenancy grows into the hundreds of thousands or even millions, managing the corresponding list of subscriptions becomes impractical requiring exorbitant commitment of resources and engineering effort. By reducing the number of subscriptions using the techniques described herein, a cloud service provider can realistically scale up to serve a large and geographically dispersed tenancy while maintaining and even enhancing security to ensure a seamless user experience.

As discussed above, and further herein, by sharing subscriptions amongst multiple tenants, the disclosed system can enable cloud service providers to efficiently manage subscriptions more efficiently and effectively. This is thanks to the significant reduction in the number of subscriptions required for a given number of tenants as a result of assigning multiple tenants to a subscription. In existing solutions that do not use multi-tenant subscription sharing, a cloud service provider must provide every tenant with a corresponding subscription which can cause subscription to become impractical as the number of tenants grows. This can potentially lead to compromised system security and ultimately a degraded user experience. By introducing subscription sharing, cloud service providers can easily and securely manage subscriptions for a large number of tenants thereby conserving computing resources and improving performance.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
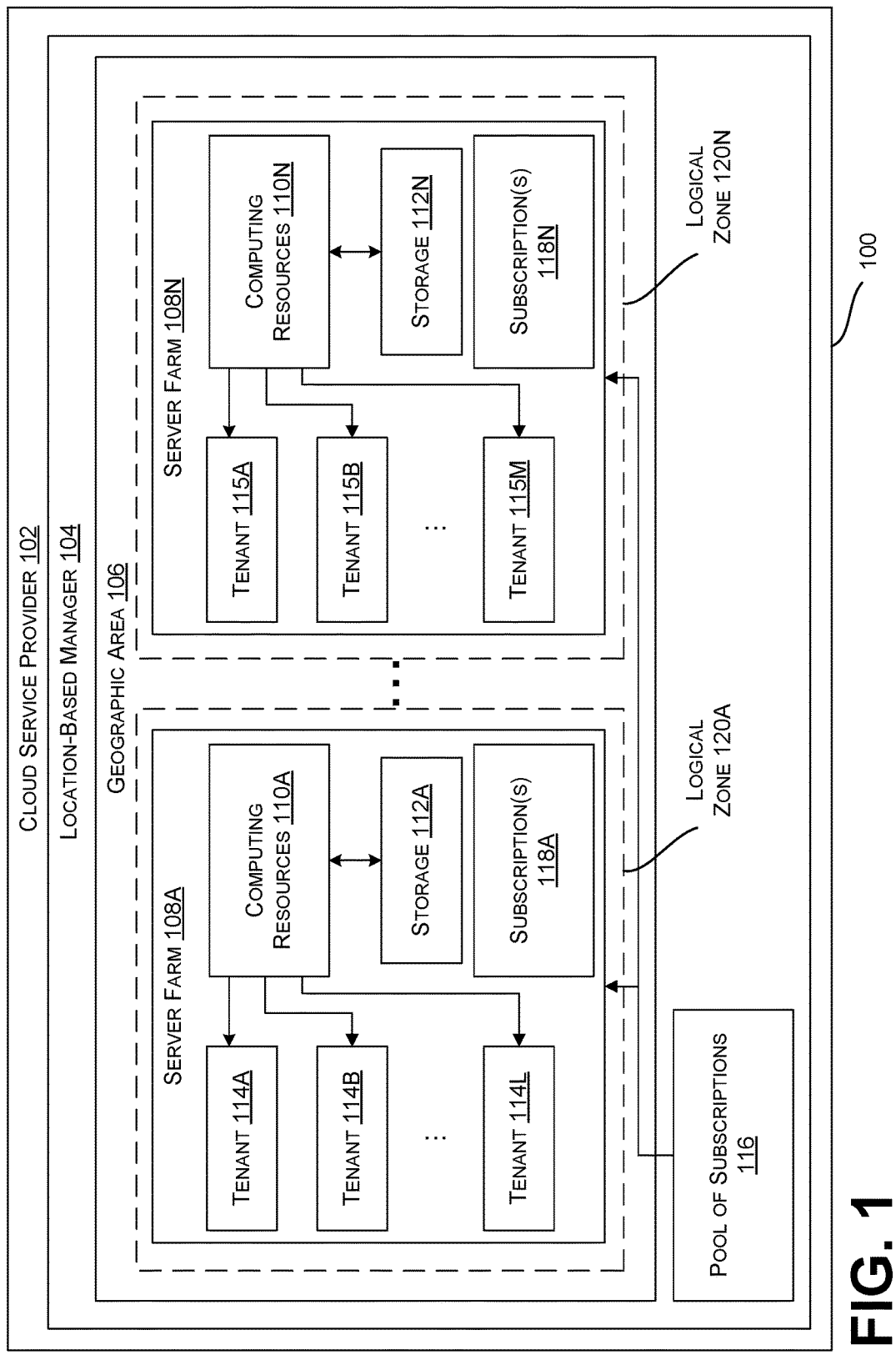
FIG. 1 is an example system architecture illustrating a cloud service provider utilizing a location-based manager to administrate resource units that provide access to cloud resources for a plurality of tenants.

The techniques described herein provide systems for optimizing the use of computing resources and to improve the operation of cloud platforms that provide cloud resources for use by tenants of a cloud service provider. Cloud resources can include computing resources, storage, and other components for executing applications, storing data, and the like. The cloud service provider can utilize one or several location-based managers to administrate various cloud resources. Specifically, the location-based manager can acquire a pool of subscriptions from the cloud platform and assign subscriptions for sharing amongst multiple tenants. Individual subscriptions within the pool of subscriptions can define various parameters such as a cloud resource allocation (e.g., a number of cores, an amount of storage space), a time period during which the subscription is active, a roster of tenants associated with the subscription, and so forth.

The disclosed techniques address several technical problems associated with subscription management in cloud service providers that utilize cloud platforms for cloud resource access. For example, to maintain security boundaries between individual tenants, typical systems assign every tenant a subscription. However, as the number of tenants grows into the millions, subscription management becomes more and more cumbersome if not ultimately infeasible leading to degraded performance and user experience. By sharing individual subscriptions among multiple tenants, the system greatly reduces the number of subscriptions to be managed thereby dramatically streamlining the process of subscription management. Naturally, streamlining subscription management leads to reductions in the resources and engineering effort required to manage the set of subscriptions for a given number of tenants. Consequently, the disclosed techniques improve the performance of cloud platforms and associated cloud service providers, with particular benefit as the number of tenants grows large.

In another example of the technical benefit of the present disclosure, the multi-tenant subscription sharing described herein improves the security of cloud platforms and consequently cloud service providers. This is possible due to the multi-tenant subscription sharing discussed above and in further detail below. By reducing the number of subscriptions to manage, security breaches among individual tenants can be detected early on and quickly addressed or contained. In addition, by assigning subscriptions at resource unit granularity rather than to individual tenants, the location-based manager can create a logical zone about individual resource units that can isolate a resource unit from other resource units. Thus, the techniques described herein enable a system to maintain existing security boundaries between tenants as well as enhance security by implementing a security boundary between resource units. Furthermore, by isolating individual resource units, the disclosed system can improve the performance of the various resource units. By minimizing the impact of security breaches, the system can consequently experience reduced downtime leading to improved performance and an enhanced user experience.

Various examples, scenarios, and aspects that enable secure multi-tenant subscription sharing are described below with reference to FIGS. 1-7.

FIG. 1 illustrates an example system 100 in which a cloud service provider 102 utilizes a location-based manager 104 to manage a geographic area 106 containing multiple server farms 108A-108N. In various examples, a geographic area can be an area defined by current geographic boundaries. In a specific example, a geographic area can be defined within the system as a well-defined subdivision of a greater region such as county of the United States, a city or municipality, and so forth. In other examples, a geographic area may be defined as an area encompassed by a certain radius (e.g., 25 miles). In addition, as will be described in more detail below, a location-based manager 104 deployed by the cloud service provider 102 can be assigned multiple geographic regions to manage, where an individual geographic region (e.g., a country) includes multiple geographic areas.

As discussed above, a geographic area 106 can include multiple server farms 108A-108N that are configured to provide access to computing resources 110A-110N and storage 112A-112N, which can collectively be referred to as cloud resources. In addition, each server farm 108 can be assigned a group of tenants that utilize the computing resources 110 and/or storage 112 of a server farm 108 to implement applications, store data, and the like. In various examples, a letter such as L, M, N, or P will be used to indicate a plurality of a particular item (e.g., server farms 108A-108N). It should be appreciated that such letters can represent a positive integer such as tens, hundreds, thousands, etc. and that different letters can represent different quantities of different items (e.g., tenants 114A-114L and tenants 115A-115M).

Figure 2:
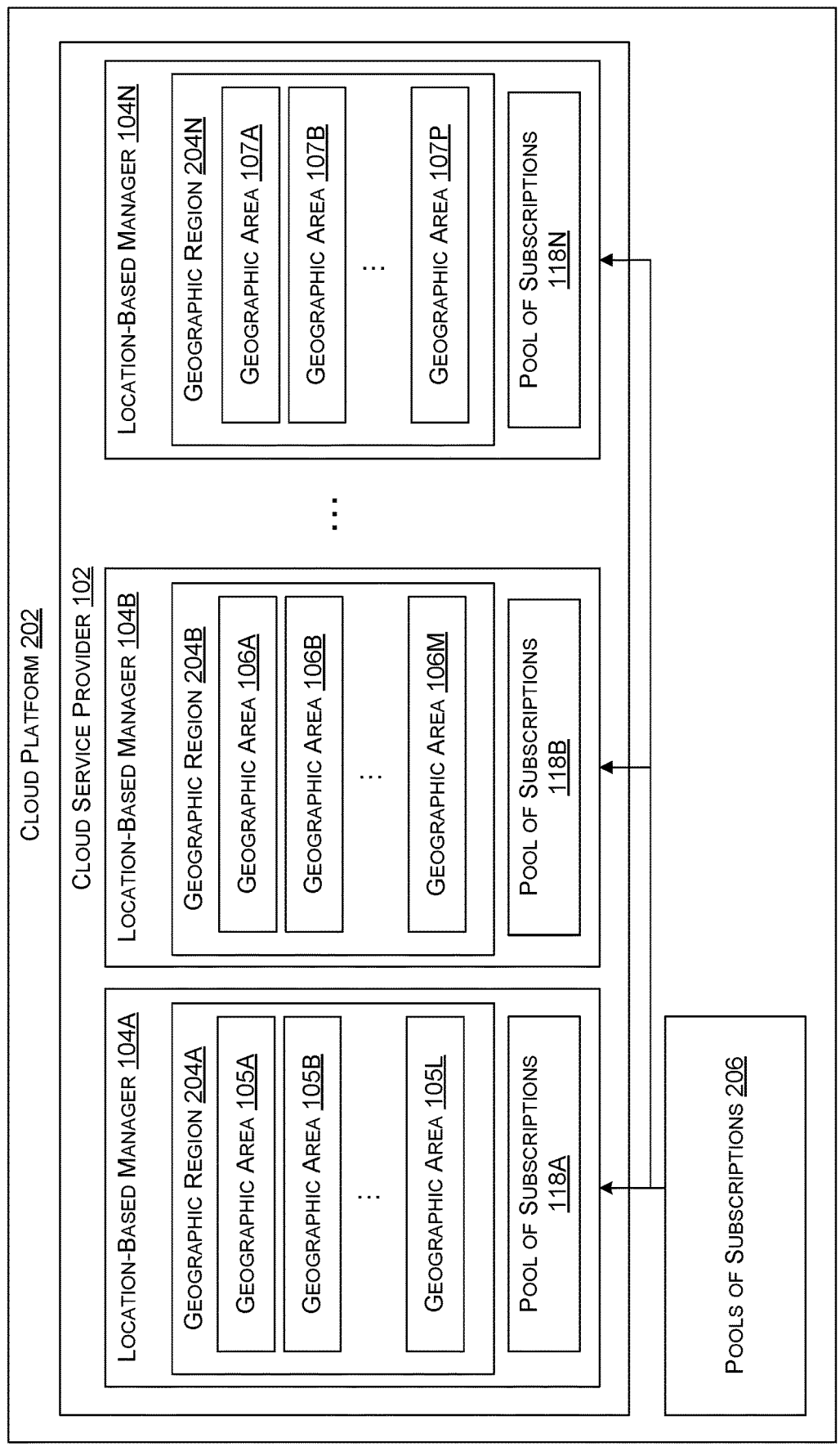
FIG. 2 is an example system architecture illustrating a cloud platform containing a cloud service provider that utilizes several location-based managers to administrate many geographic regions.

To enable the multi-tenant subscription sharing features discussed above, the location-based manager 104 can acquire a pool of subscriptions 116 from a cloud platform (see FIG. 2). The location-based manager 104 can then assign subscriptions 118 from the pool of subscriptions 116 for the various server farms 108 under its management. As discussed above, and in further detail below, individual subscriptions 118 can define various parameters such as an allocation of cloud resources (e.g., computing resources 110, storage 112), a time period during which the subscription 118 is active, and a roster of tenants 114 associated with the subscription 118. The location-based manager 104 can then associate the subscription 118 with multiple tenants 114. It should be appreciated that the location-based manager 104 can assign one or multiple subscriptions 118 for a particular server farm 108. In various examples, the number of subscriptions 118 associated with a server farm 108 can be automatically determined by the location-based manager 104 or configured as a pre-determined value by an administrative entity such as a network engineer or system administrator. For instance, a large server farm 108 having large amount of computing resources 110 and storage 112 may require multiple subscriptions 118 to efficiently subdivide the available cloud resources whereas a smaller server farm may only require a single subscription 118.

As discussed above, a subscription can define an allocation of cloud resources such as computing resources 110 and storage 112. The available cloud resource allocation can then be subdivided among a group of tenants 114 associated with the subscription 118. In various examples, and discussed further below, the cloud resource allocation for an individual tenant can be determined in several ways. For instance, a tenant may request a specific amount of computing resources 110 and/or storage 112. In a specific example, a tenant 114A wishing to implement an application on the server farm may request a specific amount of computing resources 110 (e.g., six cores, twelve cores, etc.) and a specific volume of storage 112 for data associated with the tenant's application (e.g., 25 GB). In another specific example, an allocation of cloud resources for tenant 114A can be determined automatically by the location-based manager 104. In such a scenario, tenant 114A may not be well apprised of the hardware requirements of their application. Accordingly, the tenant 114A can provide the cloud service provider 102 with information on their desired use case (e.g., a database, a machine learning application, etc.). In response, the location-based manager 104 can allocate an appropriate amount of computing resource 110 and/or storage 112 using the information provided by the tenant 114A. In addition, the location-based manager 104 can analyze other applications on server farms 108A-108N under its management as well as receive data from other location-based managers (see FIG. 2) to determine an appropriate resource allocation for the tenant 114A.

In each of the above examples, the resource allocation of an individual tenant 114 can be adjusted over time to suit changing operational needs of the tenants 114. For example, a tenant 114A may request additional computing resources 110 as their application expands and grows in complexity. In another instance, the location-based manager 104 can automatically adjust the resource allocation of a tenant 114A based on various criteria such as an activity history associated with a particular tenant, previous versions of an application associated with the tenant 114A, the amount of available computing resources 110 and/or storage 112, and the like.

As discussed above, each tenant 114 is assigned a portion of the cloud resource allocation defined in the subscription 118. Consequently, individual tenants 114 may only access computing resources 110 and storage 112 assigned to them by the location-based manager 104. For example, a tenant 114A is may only access the portion of the computing resources 110A and storage 112A assigned by the location-based manager 104 and not the resources of other tenants 114B-114L utilizing server farm 108A. Furthermore, by isolating individual tenants from each other within a server farm 108, in the event a single tenant 114A suffers a security breach, such as by a malicious attacker from outside the cloud service provider 102, the system can contain the security breach to the resources associated with the compromised tenant 114A and prevent more widespread damage to the system. In this way, the cloud service provider 102 can ensure that security boundaries between individual tenants are maintained and that each tenant 114 receives a stable user experience.

In addition to maintaining security boundaries between individual tenants 114, the location-based manager 104 can additionally assign logical zones 120A-120N that encompasses an individual corresponding server farm 108A-108N. The logical zones 120A-120N serve to logically isolate a particular server farm 108A from other server farms 108B-108N under management by the location-based manager 104. By isolating individual server farms 108 from each other, the system can prevent unauthorized access to a computing resources 110 or storage 112 of a server farm 108 from tenants 114 of another server farm. A logical zone 120 can be implemented using any method to logically isolate the server farms 108A-108N from each other. For instance, the logical zones 120A-120N can be implemented using virtual networks using various components such as virtual local area networks (VLANs), virtual switches, and the like. In addition, the VLANs can be configured to utilize standard networking protocols such as IPv4 or IPv6 which the server farms 108 can utilize for communication with the location-based manager 104, the tenants 114, and so forth.

As discussed above, by assigning a logical zone 120 to each server farm 108, the location-based manager 104 can further enhance security of the cloud service provider 102. Since server farms 108A-108N are logically isolated from each other, the logical zones 120A-120N can provide additional security boundaries between server farms 108A-108N in addition to the security boundaries that isolate individual tenants 114. Thus, if the security of a single tenant 114 is compromised such that the security boundary isolating the tenant 114 is breached, the security issue can still be contained within a single server farm 108. For instance, tenant 114A can suffer a security breach compromising the security boundary that isolates tenant 114A from tenants 114B-114L of server farm 108A. However, thanks to the logical zone 120A that bounds server farm 108A, the security breached can be contained within server farm 108A by the security boundary provided by the logical zone 120A.

Turning now to FIG. 2, aspects of a cloud platform 202 containing a cloud service provider 102 are shown and described. As discussed above, a cloud service provider 102 can utilize infrastructure such as server farms 108 and tools such as location-based manager 104 provided by a cloud platform 202 to offer products and services to tenants 114. As will be discussed with regard to FIG. 2, a cloud service provider 102 can deploy several location-based managers 104A-104N to manage server farms 108 that are dispersed across many geographic regions 204A-204N. It should be appreciated that while FIG. 2 illustrates a single cloud service provider 102, cloud platform 202 can allow any number of cloud service providers 102 to utilize infrastructure provided by the cloud platform 202.

As shown and described with respect to FIG. 1, a location-based manager 104 can be configured to manage several server farms 108A-108N located within a geographic area 106. To address diverse technical requirements, location-based managers 104A-104N can be optionally assigned a corresponding geographic region 204A-204N containing several geographic areas such as geographic areas 105A-105L with each geographic region containing several server farms 108A-108N. In this way, a cloud service provider 102 can seamlessly scale operations as its associated tenancy grows in size and becomes more geographically dispersed.

In similar fashion to geographic areas 106, a geographic region 204 can be defined using well-known boundaries such as country or state lines. For example, location-based manager 104A may be assigned geographic region 204A associated with the state of Washington while location-based manager 104B may be assigned geographic region 204B associated with the state of Oregon and so forth. Accordingly, geographic areas 105A-105L can be associated with the various counties of Washington state, Similarly, geographic areas 106A-106M can be associated with the various counties of Oregon and so forth. Alternatively, the geographic regions 204 can be defined at larger scales. For instance, location-based manager 104A can be assigned geographic region 204A corresponding to the Northwestern United States, which can include the states of Washington, Oregon, Idaho, Montana, and Wyoming. In this example, the geographic areas 105A-105L that make up the geographic region 204A can be defined as an area encompassed within a certain radius as discussed above (e.g., 25 miles). Similarly, location-based manager 104B can be assigned geographic region 204B corresponding to the Northeastern United States and so forth.

Upon assigning each location-based manager 104A-104N an associated geographic region 204A-204N, the location-based managers 104A-104N can acquire a pool of subscriptions 118A-118N from the pools of subscriptions 206 at the cloud platform 202. The individual pools of subscriptions 118 associated with each location-based manager 104 can differ based on the needs of tenants 114 served by the location-based manager 104, the size of the geographic region 204 managed by the location-based manager 104, the amount of computing resources 110 and/or storage 112 available to the location-based manager 104, among other factors. In a specific example, a location-based manager 104A may oversee a geographic region 204A containing several large server farms 108 that house a particularly high volume of computing resources 110 or storage 112. Thus, to efficiently allocate resources and serve tenants 114, location-based manager 104A may require a large pool of subscriptions 118A. Conversely, location-based manager 104B may manage a geographic region 204B that does not contain any large server farms and thus does not require as many subscriptions. Therefore, location-based manager 104B can acquire a smaller pool of subscriptions 118B in comparison to location-based manager 104A.

Individual pools of subscriptions 118 can be preconfigured at the cloud platform 202 prior to acquisition by location-based managers 104A-104N by an administrative entity such as a network engineer, a system administrator, and the like. Preconfigured pools of subscriptions 206 can be determined based on engineering analysis by the administrative entity, feedback based on previously assigned pools of subscriptions 118, and other factors. In other examples, individual pools of subscriptions 118 can be determined by the location-based manager 104 when acquiring the pool of subscriptions 118 from the cloud platform 202. As discussed above, a pool of subscriptions 118 for a particular location-based manager 104 can be customized for the needs of the location-based manager 104. In addition, a location-based manager can determine the pool of subscriptions 118 it requires based on availability of resources in server farms 108 within its associated geographic region 204, the number of tenants 114 served by the location-based manager 104, the technical needs of the tenants 114, and other factors. Furthermore, individual pools of subscriptions 118 can be adjusted by an associated location-based manager 104, over time to suit the needs of tenants 114 served by the location-based manager 104. For instance, location-based manager 104A can receive an influx of new tenants 114 in geographic region 204A. In response, the location-based manager 104A may determine that a larger pool of subscriptions 118A is needed to efficiently allocate the cloud resources under its management. Location-based manager 104A can send a request to the cloud platform 202 to acquire an updated pool of subscriptions 118A from the pools of subscriptions 206. In other examples, location-based manager 104A can acquire an updated pool of subscriptions 118A in response to cloud resource availability, increased utilization of cloud resources, among other factors.

Figure 3:
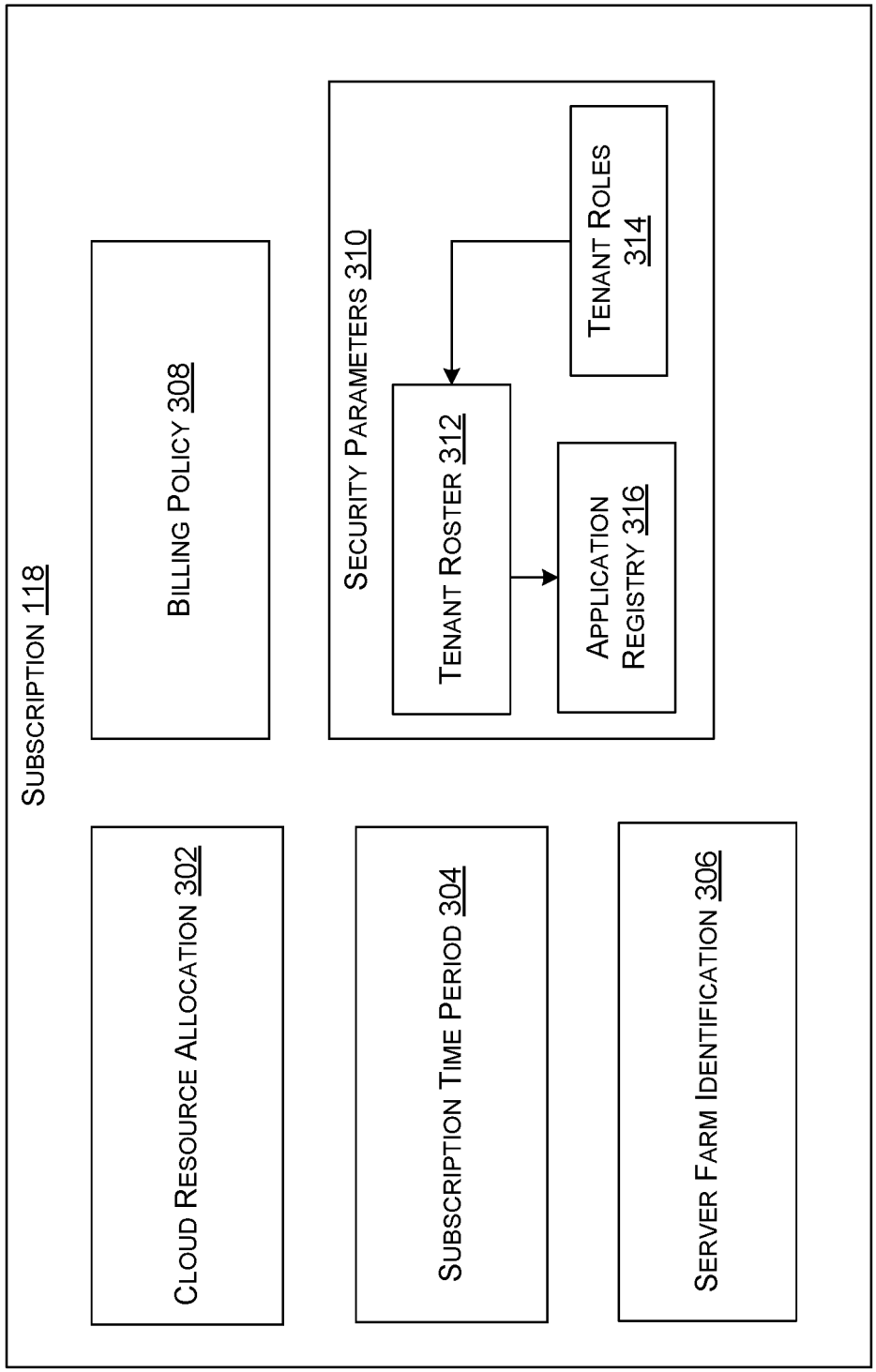
FIG. 3 is a block diagram illustrating the various example properties of a subscription.

Turning now to FIG. 3, properties of an individual subscription 118 are illustrated and described. As described above, a location-based manager 104 can utilize a subscription 118 to allocate cloud resources such as computing resources 110 and storage 112 to a group of tenants 114 where each tenant is assigned a portion of the subscription 118. In addition, assigning each tenant 114 an associated portion of the subscription 118 enables the system to maintain security boundaries between individual tenants to prevent unauthorized access to resources by the tenants 114 and to contain potential security breaches.

As discussed, each subscription 118 can include a cloud resource allocation 302 defining the amount of cloud resources (e.g., computing resources 110 and storage 112) that are available for portioning among a group of tenants 114 sharing the subscription 118. In various examples, cloud resource allocation 302 can define a specific amount of computing resources 110 and storage 112 which tenants 114 associated with the subscription 118 can utilize. For instance, cloud resource allocation 302 can specify that subscription 118 is allocated five hundred computing cores and one terabyte (TB) of storage located at a server farm 108. In this example, as described above, tenants 114 associated with subscription 118 can request a specific amount of resources (e.g., 6 cores and 25 gigabytes). Location-based manager 104 can alternatively automatically assign portions of cloud resource allocation 302 to individual tenants 114.

Cloud resource allocation 302 can also be adjusted over time to suit changing needs of tenants 114 and associated applications. For instance, a tenant 114A may require additional cloud resources as time goes on, however all available resources in cloud resource allocation 302 may have been allocated to tenants 114B-114L. Location-based manager 104 can modify the parameters of cloud resource allocation 302 to allow tenant 114A to request additional resources. Alternatively, location-based manager 104 can acquire a new subscription 118 with a different cloud resource allocation 302 that specifies an increased amount of available cloud resources at server farm 108A.

Subscription 118 can also include a subscription time period 304 that specifies a time period during which cloud resources allocated by cloud resource allocation 302 are available for use by tenants 114 associated with subscription 118. For instance, subscription time period 304 can specify that subscription 118 is valid for a period of one month. Accordingly, tenants 114 associated with subscription 118 can access cloud resources at server farm 108 for one month. Upon expiration of subscription time period 304, tenants 114 associated with subscription 118 can request a renewed subscription 118 which can be assigned by location-based manager 104. Alternatively, location-based manager 104 can detect that subscription time period 304 is nearing expiration can query tenants 114 associated with subscription 118 to renew subscription 118. Location-based manager 104 can then automatically assign tenants 114 with a new subscription 118 having an updated subscription time period 304. In still other examples, location-based manager 104 can modify subscription time period 304 to extend access for associated tenants 114 upon expiration of subscription time period 304.

As discussed above, an individual server farm 108 can have one or multiple associated subscriptions 118. Thus, it should be understood that varying subscriptions 118 can have varying subscription time periods 304. For instance, a subscription 118 associated with server farm 108A may have an associated subscription time period 304 of two months whereas another subscription 118 can have an associated subscription time period 304 of six months. In addition, location-based manager 104 can assign subscriptions to tenants 114 based on how long a tenant 114 requests to have access to cloud resources at server farm 108A. For example, a tenant 114 may requests cloud resource access for a period of two months. Location-based manager 104 can accordingly associate tenant 114 with a subscription 118 having a subscription time period 304 of two months.

Subscription 118 can additionally contain a server farm identification 306 that specifies a server farm 108 associated with subscription 118. Server farm identification 118 can include data to identify associated server farm 108 such as serial numbers, IP addresses, geographic coordinates, and so forth. Similarly, subscription 118 can include billing policy 308 that specifies terms for tenants to purchase access to cloud resources provided by cloud platform 202 and/or products or services provided by cloud service provider 102. For example, billing policy 308 can include fees paid periodically by individual tenants (e.g., once a month).

As discussed above, sharing a subscription 118 among multiple tenants allows a cloud service provider 102 to maintain security boundaries for individual tenants 114 while also dramatically reducing the number of subscriptions required to do so. This is possible by including security parameters 310 within subscription 118. Security parameters 310 utilize a tenant roster 312 in conjunction with tenant roles 314 to set appropriate security boundaries for individual tenants and maintain a secure cloud environment. When assigning a subscription to various tenants 114, location-based manager 104 can enumerate each associated tenant 114 in tenant roster 312. A tenant 114 within tenant roster 312 can be identified using any suitable method such as a username, a unique identification number, an IP address, and so forth. In addition, tenants can be identified using any combination of the above-mentioned attributes or other attributes.

Location-based manager 104 can also assign a role to each tenant of tenant roster 312 from tenant roles 314. Tenant roles 314 allow the location-based manager 104 to securely grant access to cloud resources to various tenants 114. Tenant roles 314 can include roles of various privilege within the system. For instance, a tenant 114 may be assigned an "administrator" role which allows tenant 114 to freely access and modify data in their associated allocation of storage 112 among other benefits. In another example, a tenant 114 may be assigned a "reader" role which restricts tenant 114 from modifying data in their associated storage 112. In a specific example, an allocation of computing resources 110 and storage 112 is shared by multiple tenants 114 belonging to the same organization (e.g., a shared workspace, a shared database, etc.). In this example, certain tenants 114 can be assigned the role of "administrator" while others are assigned as "reader." In this way, the system can maintain secure access to cloud resources and applications for individual tenants even when tenants share a cloud resource allocation.

Furthermore, security parameters 310 can include application registry 316 which identifies applications utilizing cloud resources at server farm 108 associated with subscription 118 in server farm identification 306. Upon requesting cloud resource access and being added to the tenant roster, tenants 114 can also register their associated applications with location-based manager 104 which is tracked in application registry 316. For instance, if a tenant 114 wishes to implement a cloud database application, the application must be registered with the location-based manager in the application registry 316. Thus, each tenant utilizing cloud resources of server farm 108 is associated with at least one application thereby streamlining subscription management and enhancing security of cloud service provider 102.

Figure 4:
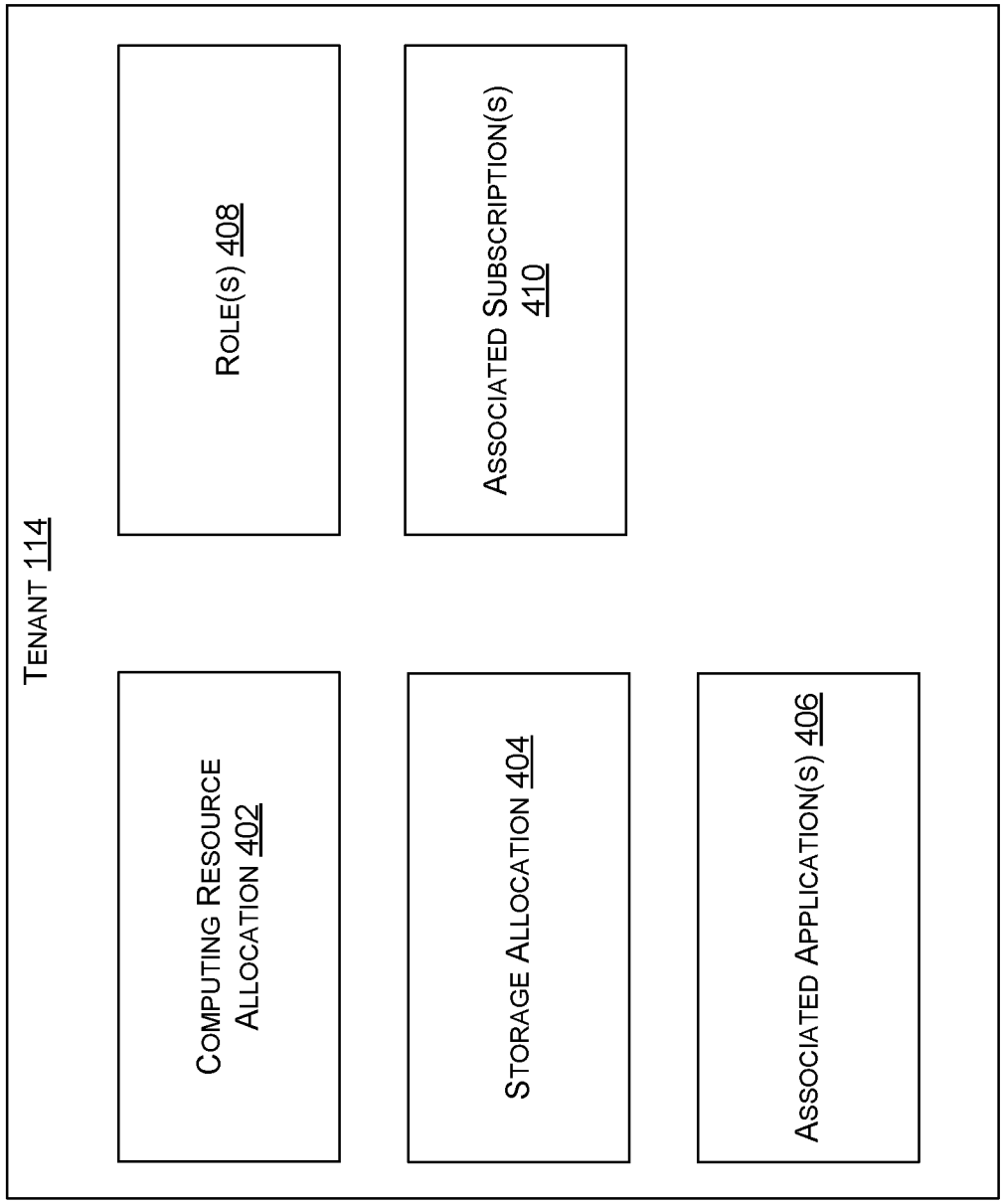
FIG. 4 is a block diagram illustrating the various example attributes associated with a tenant.

Turning now to FIG. 4, aspects of an individual tenant 114 are illustrated and described. As discussed above, individual tenants have several associated attributes such as a cloud resource allocation which can include computing resource allocation 402 and storage allocation 404. Computing resource allocation 402 and storage allocation 404 can be determined based on a request generated by tenant 114 for access to a specific amount of cloud resources (e.g., 6 cores of compute, 25 GB of storage). In other examples, computing resource allocation 402 and storage allocation 404 can be configured by an administrative entity associated with tenant 114. For instance, tenant 114 can be a computing device associated with a staff member at a particular company. In this example, computing resource allocation 402 and storage allocation 404 can be determined by the staff member's supervisor, IT department, and the like. In still other examples, computing resource allocation 402 and storage allocation 404 can be automatically assigned to tenant 114 by location-based manager 104 based on availability of cloud resources, current network traffic, user activity associated with the tenant, and so forth.

Tenant 114 can additionally contain data defining relationships between tenant 114, cloud service provider 102, and cloud platform 202 such as associated applications 406, roles 408, and associated subscriptions 410. As discussed above, each tenant 114 is associated with an application in application registry 316. It should be understood that tenant 114 can be associated with one or multiple applications. For example, tenant 114 may implement a database and a deep learning application utilizing server farm 108, thus tenant 114 must register each application with location-based manager 104. Similarly, tenant 114 can be associated with a role 408 or multiple roles. For instance, tenant 114 may belong to an organization that utilizes a shared cloud workspace housed at server farm 108 for communication and collaboration. In this case, tenant 114 can be assigned a role that enables them to communicate and share data but not modify some data such as underlying settings of the shared workspace. Conversely, in a personal workspace associated with tenant 114, tenant 114 may be assigned a role that allows them to freely access and modify data. For tenant 114 to have multiple roles 408, tenant 114 can also be associated with one or multiple subscriptions 410. As discussed, tenant 114 can have access to multiple spaces that utilize different allocations of cloud resources such as the above-mentioned shared workspace and personal workspace. Consequently, tenant 114 can be associated with subscriptions that correspond to each of those spaces.

Figure 5:
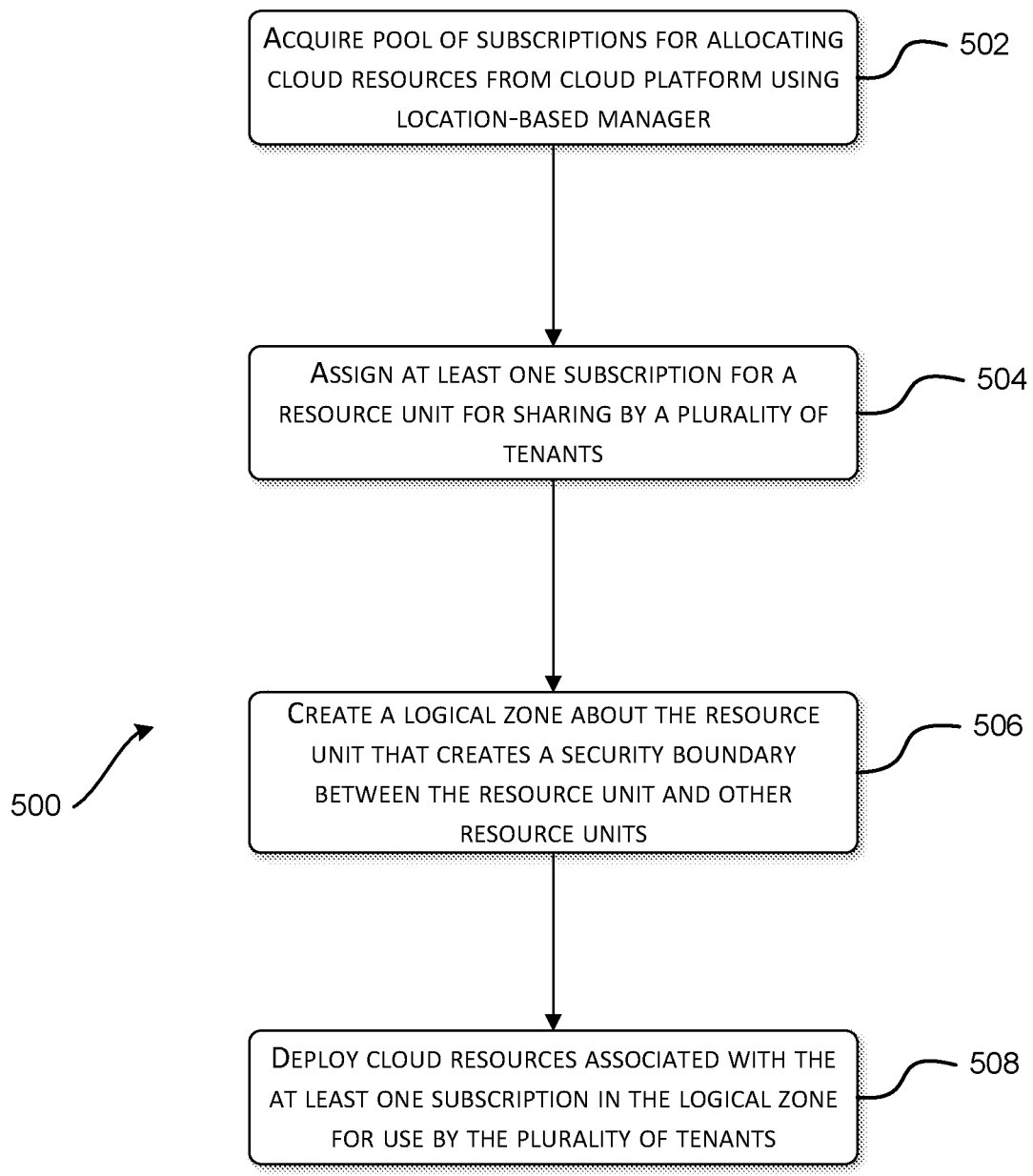
FIG. 5 is a flow diagram showing aspects of a routine for enabling the techniques disclosed herein.

Referring now to FIG. 5, aspects of a routine 500 for enabling secure multi-tenant subscription sharing are shown and described below. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, routine 500 beings at operation 502 where a location-based manager acquires a pool of subscriptions from a cloud platform. As discussed, the subscriptions define a set of cloud resources provided by the cloud platform that are available for use by a cloud service provider for a defined period of time.

Proceeding to operation 504, the location-based manager assigns at least one subscription for a resource unit (e.g., a server farm) of the cloud platform. As described above, the at least one subscription is shared among a plurality of tenants that each request access to cloud resources provided by the resource unit.

Next, at operation 506, the location-based manager creates a logical zone about the resource unit that effectively isolates the resource unit from other resource units managed by the location-based manager. This logical zone, as shown in FIG. 1, creates the security boundary that separates individual resource units and enhances security of the cloud service provider.

Finally, at operation 508, the location-based manager deploys cloud resources associated with the at least one subscription for use by the plurality of tenants that share the subscription. As discussed above, the subscription can be updated or replaced over time by the location-based manager based on a variety of factors such as the number of tenants, cloud resource availability, and subscription time period.

Figure 6:
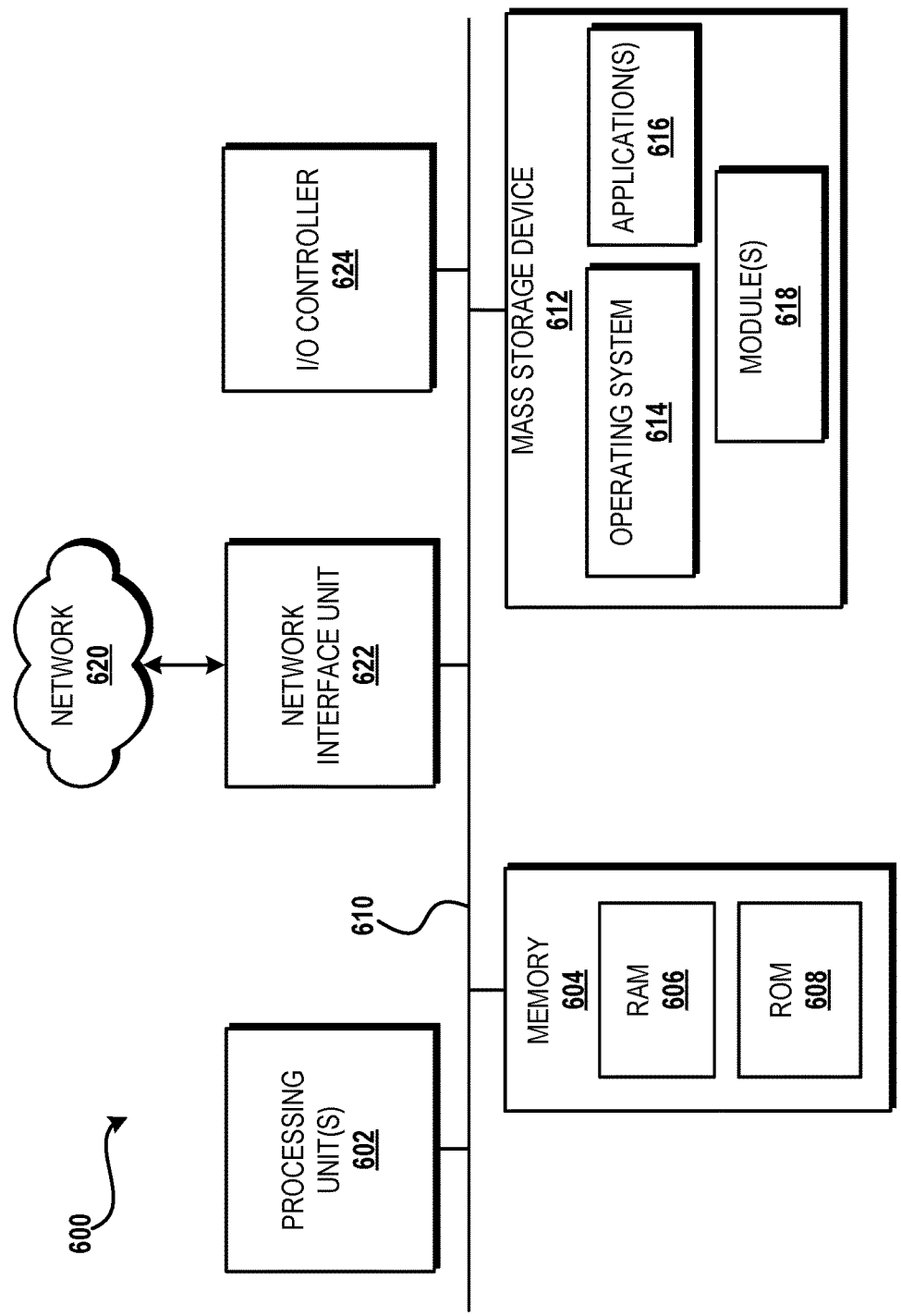
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the system 100, capable of executing computer instructions (e.g., a module or a program component described herein). The computer architecture 600 illustrated in FIG. 6 includes processing unit(s) 602, a system memory 604, including a random-access memory 606 ("RAM") and a read-only memory ("ROM") 608, and a system bus 610 that couples the memory 604 to the processing unit(s) 602.

Processing unit(s), such as processing unit(s) 602, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transition between states, thereby transforming the transistors or other discrete hardware elements constituting the processing unit(s) 602.

Figure 7:
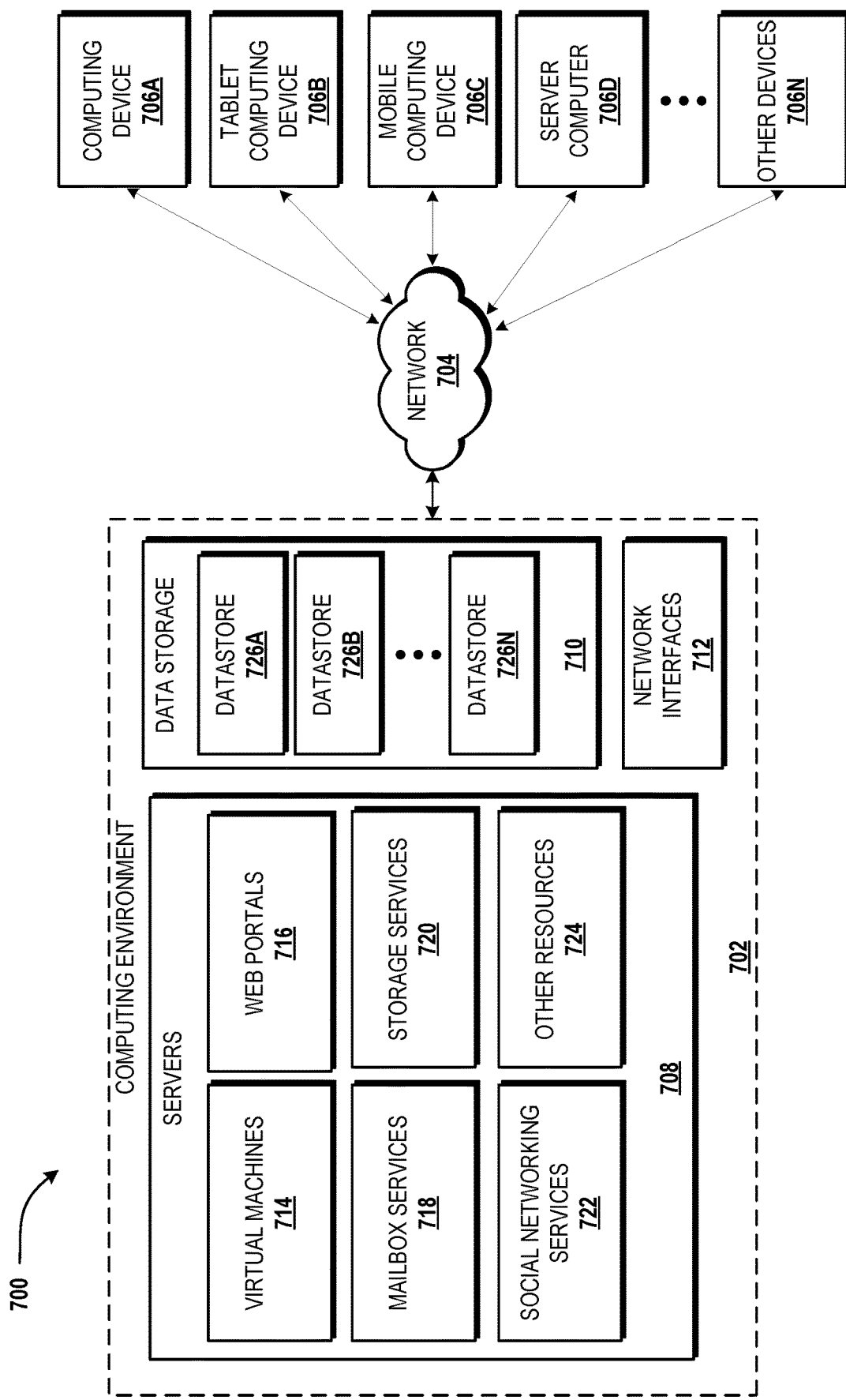
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "clients 706" and also referred to herein as computing devices 706) can communicate with the computing environment 702 via the network 704. In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or, social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the servers 708 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method comprising: acquiring, by one or more processing units of a location-based manager of a cloud service provider, a pool of subscriptions from a cloud platform configured to allocate cloud resources to the cloud service provider, where each subscription defines a specific set of cloud resources allocated for use for a defined time period; assigning, by the location-based manager of the cloud service provider, at least one subscription of the pool of subscriptions for a resource unit of the cloud platform, wherein the at least one subscription is shared by a plurality of tenants configured to request access to the cloud resources from the resource unit; creating, by the location-based manager of the cloud service provider, a logical zone that effectively creates a security boundary between the resource unit and other resource units managed by the location-based manager; and deploying, by the location-based manager of the cloud service provider, the cloud resources associated with the at least one subscription within the logical zone for use by the resource unit on behalf of the plurality of tenants.

Example Clause B, the method of Example Clause A, wherein the security boundary between the resource unit and other resource units comprises a virtual network.

Example Clause C, the method of Example Clause A or Example Clause B, wherein the security boundary is a first security boundary that isolates the resource unit from the other resource units managed by the location-based manager and the logical zone comprises one or more second security boundaries that isolate individual tenants of the plurality of tenants from other tenants of the plurality of tenants.

Example Clause D, the method of Example Clause C, wherein a second security boundary comprises one or more security parameters defined in the at least one subscription.

Example Clause E, the method of any one of Example Clauses A through D, wherein the location-based manager is configured to manage a geographic region comprising a plurality of geographic areas, and the location-based manager is deployed as a plurality of instances where each instance has an associated geographic area for managing cloud resources.

Example Clause F, the method of any one of Example Clauses A through E, wherein the allocation of cloud resources defined by each subscription of the pool of subscriptions is based on at least one of an availability of cloud resources at the cloud platform, a number of tenants utilizing the cloud service provider, or a geographic location of the cloud service provider.

Example Clause G, the method of any one of Example Clauses A through F, wherein the allocation of cloud resources defined by each subscription of the pool of subscriptions is adjusted based on data defining tenant activity by the plurality of tenants utilizing the cloud service provider.

Example Clause H, a system comprising: one or more processing units; and a computer-readable medium having encoded thereon computer-readable instructions to cause the one or more processing units to: acquire, by a location-based manager of a cloud service provider, a pool of subscriptions from a cloud platform configured to allocate cloud resources to the cloud service provider, where each subscription defines a specific set of cloud resources allocated for use for a defined time period; assign, by the location-based manager of the cloud service provider, at least one subscription of the pool of subscriptions for a resource unit of the cloud platform, wherein the at least one subscription is shared by a plurality of tenants configured to request access to the cloud resources from the resource unit; create, by the location-based manager of the cloud service provider, a logical zone that effectively creates a security boundary between the resource unit and other resource units managed by the location-based manager; and deploy, by the location-based manager of the cloud service provider, the cloud resources associated with the at least one subscription within the logical zone for use by the resource unit on behalf of the plurality of tenants.

Example Clause I, the system of Example Clause H, wherein the security boundary between the resource unit and the other resource units comprises a virtual network.

Example Clause J, the system of Example Clause H or Example Clause I, wherein the security boundary is a first security boundary that isolates the resource unit from the other resource units managed by the location-based manager and the logical zone comprises one or more second security boundaries that isolate individual tenants of the plurality of tenants from other tenants of the plurality of tenants.

Example Clause K, the system of Example Clause J, wherein a second security boundary comprises one or more security parameters defined in the at least one subscription.

Example Clause L, the system of any one of Example Clauses H through K, wherein the location-based manager is configured to manage a geographic region comprising a plurality of geographic areas, and the location-based manager is deployed as a plurality of instances where each instance has an associated geographic area for managing cloud resources.

Example Clause M, the system of any one of Example Clauses H through L, wherein the allocation of cloud resources defined by each subscription of the pool of subscriptions is based on at least one of an availability of cloud resources at the cloud platform, a number of tenants utilizing the cloud service provider, or a geographic location of the cloud service provider.

Example Clause N, the system of any one of Example Clauses H through M, wherein the allocation of cloud resources defined by each subscription of the pool of subscriptions is adjusted based on data defining tenant activity by the plurality of tenants utilizing the cloud service provider.

Example Clause O, a computer-readable storage medium having encoded thereon computer-readable instructions that, when executed by one or more processing units, cause the one or more processing units to: acquire, by a location-based manager of a cloud service provider, a pool of subscriptions from a cloud platform configured to allocate cloud resources to the cloud service provider, where each subscription defines a specific set of cloud resources allocated for use for a defined time period; assign, by the location-based manager of the cloud service provider, at least one subscription of the pool of subscriptions for a resource unit of the cloud platform, wherein the at least one subscription is shared by a plurality of tenants configured to request access to the cloud resources from the resource unit; create, by the location-based manager of the cloud service provider, a logical zone that effectively creates a security boundary between the resource unit and other resource units managed by the location-based manager; and deploy, by the location-based manager of the cloud service provider, the cloud resources associated with the at least one subscription within the logical zone for use by the resource unit on behalf of the plurality of tenants.

Example Clause P, the computer-readable storage medium of Example Clause O, wherein the security boundary between the resource unit and the other resource units comprises a virtual network.

Example Clause Q, the computer-readable storage medium of Example Clause O or Example Clause P, wherein the security boundary is a first security boundary that isolates the resource unit from the other resource units managed by the location-based manager and the logical zone comprises one or more second security boundaries that isolate individual tenants of the plurality of tenants from other tenants of the plurality of tenants.

Example Clause R, the computer-readable storage medium of Example Clause Q, wherein a second security boundary comprises one or more security parameters defined in the at least one subscription.

Example Clause S, the computer-readable storage medium of any one of Example Clauses O through R, wherein the location-based manager is configured to manage a geographic region comprising a plurality of geographic areas, and the location-based manager is deployed as a plurality of instances where each instance has an associated geographic area for managing cloud resources.

Example Clause T, the computer-readable storage medium of any one of Example Clauses O through S, wherein the allocation of cloud resources defined by each subscription of the pool of subscriptions is adjusted based on data defining tenant activity by the plurality of tenants utilizing the cloud service provider.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different server farms, two different location-based managers, etc.).

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
acquiring, by one or more processing units of a location-based manager of a cloud service provider that manages a set of cloud resources, a pool of subscriptions from a cloud platform configured to allocate the set of cloud resources to the cloud service provider, where each subscription defines a specific subset of the set of cloud resources allocated for use for a defined time period;
assigning, by the location-based manager of the cloud service provider, at least one subscription of the pool of subscriptions for a resource unit of the cloud platform, wherein the at least one subscription is shared by a plurality of tenants configured to request access to the specific subset of the set of cloud resources defined by the at least one subscription from the resource unit;
creating, by the location-based manager of the cloud service provider, a logical zone that defines a first security boundary between the resource unit and other resource units managed by the location-based manager, wherein the logical zone includes one or more second security boundaries that isolate individual tenants of the plurality of tenants from other tenants of the plurality of tenants that share the at least one subscription; and
deploying, by the location-based manager of the cloud service provider, the specific subset of the set of cloud resources associated with the at least one subscription within the logical zone for use by the resource unit on behalf of the plurality of tenants.

2. The method of claim 1, wherein the first security boundary between the resource unit and other resource units comprises a virtual network.

3. The method of claim 1, wherein the one or more second security boundaries comprise one or more security parameters defined in the at least one subscription.

4. The method of claim 1, wherein the location-based manager is configured to manage a geographic region comprising a plurality of geographic areas, and the location-based manager is deployed as a plurality of instances where each instance has an associated geographic area for managing cloud resources.

5. The method of claim 1, wherein the allocation of cloud resources defined by each subscription of the pool of subscriptions is based on at least one of an availability of cloud resources at the cloud platform, a number of tenants utilizing the cloud service provider, or a geographic location of the cloud service provider.

6. The method of claim 1, wherein the allocation of cloud resources defined by each subscription of the pool of subscriptions is adjusted based on data defining tenant activity by the plurality of tenants utilizing the cloud service provider.

7. The method of claim 1, further comprising:
detecting a security breach that compromises at least one of the one or more second security boundaries that isolate the individual tenants; and
in response to detecting the security breach, containing the security breach within the resource unit using the first security boundary between the resource unit and the other resource units managed by the location-based manager.

8. A system comprising:
one or more processing units; and
a computer-readable medium having encoded thereon computer-readable instructions to cause the one or more processing units to:
acquire, by a location-based manager of a cloud service provider that manages a set of cloud resources, a pool of subscriptions from a cloud platform configured to allocate the set of cloud resources to the cloud service provider, where each subscription defines a specific subset the set of cloud resources allocated for use for a defined time period;
assign, by the location-based manager of the cloud service provider, at least one subscription of the pool of subscriptions for a resource unit of the cloud platform, wherein the at least one subscription is shared by a plurality of tenants configured to request access to the specific subset of the set of cloud resources defined by the at least one subscription from the resource unit;
create, by the location-based manager of the cloud service provider, a logical zone that defines a first security boundary between the resource unit and other resource units managed by the location-based manager, wherein the logical zone includes one or more second security boundaries that isolate individual tenants of the plurality of tenants from other tenants of the plurality of tenants that share the at least one subscription; and
deploy, by the location-based manager of the cloud service provider, the specific subset of the set of cloud resources associated with the at least one subscription within the logical zone for use by the resource unit on behalf of the plurality of tenants.

9. The system of claim 8, wherein the first security boundary between the resource unit and the other resource units comprises a virtual network.

10. The system of claim 8, wherein the one or more second security boundaries comprise one or more security parameters defined in the at least one subscription.

11. The system of claim 8, wherein the location-based manager is configured to manage a geographic region comprising a plurality of geographic areas, and the location-based manager is deployed as a plurality of instances where each instance has an associated geographic area for managing cloud resources.

12. The system of claim 8, wherein the allocation of cloud resources defined by each subscription of the pool of subscriptions is based on at least one of an availability of cloud resources at the cloud platform, a number of tenants utilizing the cloud service provider, or a geographic location of the cloud service provider.

13. The system of claim 8, wherein the allocation of cloud resources defined by each subscription of the pool of subscriptions is adjusted based on data defining tenant activity by the plurality of tenants utilizing the cloud service provider.

14. The system of claim 8, wherein the computer-readable instructions further cause the one or more processing units to:

detect a security breach that compromises at least one of the one or more second security boundaries that isolate the individual tenants; and in response to detecting the security breach, contain the security breach within the resource unit using the first security boundary between the resource unit and the other resource units managed by the location-based manager.

15. A computer-readable storage medium having encoded thereon computer-readable instructions that, when executed by one or more processing units, cause the one or more processing units to:

acquire, by a location-based manager of a cloud service provider that manages a set of cloud resources, a pool of subscriptions from a cloud platform configured to allocate the set of cloud resources to the cloud service provider, where each subscription defines a specific subset of the set of cloud resources allocated for use for a defined time period;

assign, by the location-based manager of the cloud service provider, at least one subscription of the pool of subscriptions for a resource unit of the cloud platform, wherein the at least one subscription is shared by a plurality of tenants configured to request access to the specific subset of the set of cloud resources defined by the at least one subscription from the resource unit;

create, by the location-based manager of the cloud service provider, a logical zone that defines a first security boundary between the resource unit and other resource units managed by the location-based manager, wherein the logical zone includes one or more second security boundaries that isolate individual tenants of the plurality of tenants from other tenants of the plurality of tenants that share the at least one subscription; and deploy, by the location-based manager of the cloud service provider, the specific subset of the set of cloud resources associated with the at least one subscription within the logical zone for use by the resource unit on behalf of the plurality of tenants.

16. The computer-readable storage medium of claim 15, wherein the first security boundary between the resource unit and the other resource units comprises a virtual network.

17. The computer-readable storage medium of claim 15, wherein the one or more second security boundaries comprise one or more security parameters defined in the at least one subscription.

18. The computer-readable storage medium of claim 15, wherein the location-based manager is configured to manage a geographic region comprising a plurality of geographic areas, and the location-based manager is deployed as a plurality of instances where each instance has an associated geographic area for managing cloud resources.

19. The computer-readable storage medium of claim 15, wherein the allocation of cloud resources defined by each subscription of the pool of subscriptions is adjusted based on data defining tenant activity by the plurality of tenants utilizing the cloud service provider.

20. The computer-readable storage medium of claim 15, wherein the computer-readable instructions further cause the one or more processing units to:

detect a security breach that compromises at least one of the one or more second security boundaries that isolate the individual tenants; and in response to detecting the security breach, contain the security breach within the resource unit using the first security boundary between the resource unit and the other resource units managed by the location-based manager.

\* \* \* \* \*